United States Patent
Kliwer et al.

(10) Patent No.: US 6,228,478 B1
(45) Date of Patent: *May 8, 2001

(54) METHOD OF MANUFACTURING A COMPOSITE FOAM FROM FOAM FLAKES, COMPOSITE FOAM, AND USE OF THIS COMPOSITE FOAM

(75) Inventors: Carsten Kliwer; Christoph Kittel, both of Nienhagen (DE)

(73) Assignee: Stankiewicz GmbH, Adelheidsdorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/732,276

(22) PCT Filed: May 2, 1995

(86) PCT No.: PCT/EP95/01659

§ 371 Date: Dec. 16, 1996

§ 102(e) Date: Dec. 16, 1996

(87) PCT Pub. No.: WO95/29951

PCT Pub. Date: Nov. 9, 1995

(30) Foreign Application Priority Data

May 3, 1994 (DE) ................................................ 44 15 586

(51) Int. Cl.[7] ...................................................... B29C 67/20
(52) U.S. Cl. ....................... 428/317.7; 264/122; 264/489; 264/916
(58) Field of Search ..................................... 264/916, 128, 264/413, 122, 489; 428/317.1, 317.7; 181/288

(56) References Cited

U.S. PATENT DOCUMENTS

3,114,722 * 12/1963 Einhorn et al. ......................... 521/54
3,717,597 * 2/1973 Hesskamp et al. ..................... 521/54

(List continued on next page.)

FOREIGN PATENT DOCUMENTS

932 514 * 8/1973 (CA) ..................................... 264/109
2 006 741 3/1974 (DE) .
29 49 392 5/1981 (DE) .

(List continued on next page.)

OTHER PUBLICATIONS

Petition dated Apr. 14, 1997, in response to Opposition Against German Patent No. P 44 15 586.7–43 filed on behalf of C.A. Greiner & Söhne GmbH.

(List continued on next page.)

Primary Examiner—Allan R. Kuhns
(74) Attorney, Agent, or Firm—Marshall, O'Toole Gerstein, Murray & Borun

(57) ABSTRACT

For manufacturing a composite foam, having acoustic properties, foam flakes (8) of differing sizes, differing origins, and/or differing material compositions are wetted with a small quantity of a polyurethane dispersion binding agent. The mixture is subsequently combined to a molded part (1) or to continuous web and under the effect of hot (water) steam or microwave energy is cured and subsequently dried. The composite foam can be used for sound insulation purposes in vehicles and in general machinery construction, and also in building construction.

11 Claims, 1 Drawing Sheet

U.S. PATENT DOCUMENTS

| | | | |
|---|---|---|---|
| 4,243,625 | * 1/1981 | Burge | 264/122 |
| 4,315,996 | 2/1982 | Baatz et al. | 521/54 |
| 4,382,758 | * 5/1983 | Nopper et al. | 425/83.1 |
| 4,446,293 | 5/1984 | König et al. | 528/45 |
| 4,451,583 | * 5/1984 | Chesler | 521/49.5 |
| 4,742,095 | 5/1988 | Markusch et al. | 523/322 |
| 5,055,339 | 10/1991 | Eder et al. | 428/157 |
| 5,292,462 | * 3/1994 | Nestle | 264/109 |
| 5,492,550 | * 2/1996 | Krishnan et al. | 51/298 |
| 5,525,278 | * 6/1996 | Krosch et al. | 264/916 |
| 5,563,208 | 10/1996 | König et al. | 524/591 |
| 5,610,207 | * 3/1997 | de Simone et al. | 428/304.4 |

FOREIGN PATENT DOCUMENTS

| | | |
|---|---|---|
| 36 27 431 | 3/1987 | (DE) . |
| 38 25 251 | 4/1989 | (DE) . |
| 40 25 102 | 2/1992 | (DE) . |
| 42 18 184 | 12/1993 | (DE) . |
| 0 031 425 | 10/1984 | (EP) . |
| 0 065 688 | 4/1985 | (EP) . |
| 0 350 807 | 1/1990 | (EP) . |
| 0 486 105 | 5/1992 | (EP) . |
| 53-120778 | 10/1978 | (JP) | C08J/9/02 |
| 59-158242 | * 9/1984 | (JP) | 264/128 |
| 63-19231 | 7/1986 | (JP) | B29C/67/20 |
| 63-121525 | 1/1987 | (JP) | B29C/67/10 |
| 62-257838 | * 11/1987 | (JP) | 428/317.7 |
| 3-281316 | 3/1990 | (JP) | B29C/43/00 |
| 2-265737 | * 10/1990 | (JP) | 428/317.1 |
| 4-325510 | 4/1991 | (JP) | C08G/18/00 |
| WO 92/02575 | 2/1992 | (WO) | C08J/9/35 |
| WO 95/14055 | 5/1995 | (WO) . | |

OTHER PUBLICATIONS

Petition dated Jan. 12, 1998, in support of Response to Opposition Against German Patent No. P 44 15 586.7–43 filed on behalf of C.A. Greiner & Söhne GmbH.

Notice of Oppositon Against German Patent No. P 44 15 586.7–43 filed on behalf of C.A. Greiner & Söhne GmbH (and English translation thereof).

Notice of Opposition Against German Patent No. P 44 15 586.7–43 filed on behalf of Metzeler Schaum GmbH (and English translation thereof).

* cited by examiner

METHOD OF MANUFACTURING A COMPOSITE FOAM FROM FOAM FLAKES, COMPOSITE FOAM, AND USE OF THIS COMPOSITE FOAM

The invention relates to a method of manufacturing a composite foam, having acoustic properties, from foam flakes, a composite foam manufactured by the method and the use of such a composite foam.

The manufacture of composite foam from foam flakes has been known in practice for a considerable time, for example for the in-house processing (recycling) of remainder or waste materials arising in the course of production. This processing—of material per se of only one kind—poses no problems apart from the possible different colours of the foam flakes, so long as no particular demands are made of the production process and the desired properties of the product.

In a known procedure according to EP-B1-0 031 425 foam (foamed material) flakes are wetted with an aqueous dispersion and/or an aqueous solution which contains dispersed or dissolved components for attaining particular characteristics, and the mixture is cured together with a binding agent which is such as to form polyurethane. By means of this manner of manufacture, the thermal formability, the possibility of high frequency welding and the fire-resistance properties are intended to be improved, as well as further characteristics and effects achieved. The method is, however, relatively complex, in particular time consuming, and employs prepolymers and heat which must be supplied either in the oven or by means of a hot air blower. In the subsequent drying in a drying chamber, the curing time for the parts is about two hours, it being possible to reduce this by the employment of hot air to as little as 15 minutes. By means of the addition of dissolved solids, such as for example colour pigments, it is intended that the end product should be given a uniform appearance.

However, no teaching is given to the skilled man in the relevant technical field which enables him to combine foam flakes of differing sizes, differing origins and/or differing material compositions, to a composite foam. Likewise, no indication is given as to how the quantity of binding agent to be used and other supplemental materials such as separator or release agents can be reduced without making worse the mechanical and physical characteristic values of the composite foam of foam flakes, in particular with regard to acoustic characteristics.

This is, however, of significance and of increasing importance. Because of the conventional manufacture of such molded part in molds, the consumption of release agent for achieving removability from the mold should be as little as possible, for reasons of environmental protection. Because of the possible future duty of the manufacturer to take back old motor vehicles, for example, there will in future be additional large quantities of foam materials, for example from seat cushioning and sound insulation, in addition to the usual quantities of residual materials from production, which will have to be re-processed.

It is therefore the object of the invention to further develop the known method so that despite lesser quantities of binding agent and despite the employment of foam flakes of differing sizes, differing origin and/or differing material composition, composite foams can be achieved the mechanical properties of which are comparable with those composite foams manufactured in accordance with the present technology and additionally have sound insulation characteristics.

In accordance therewith, foam flakes of various origins and/or various compositions are combined in accordance with per se know techniques to different molded parts in an energy and cost-saving method, whereby by embedding such parts in new parts of foam, preferably of polyurethane foam, subsequent recycling—of material of one kind—is favoured, even when the composite foam and the newly manufactured polyurethane foam are employed together as acoustic spring within a mass-spring-system. The acoustically effective mass of this system is in such a case conventionally formed by means of a sound damping heavy layer of per se conventional art, as flexibly yielding as possible.

The binding agent, which is added in only low weight-percent proportions, is inactive at room temperature and provides for a very good wetting of the foam flakes which even after the wetting can be conveyed (transported) and dosed well. As a result of this kind of pre-treatment of the foam flakes, a continuous manufacture of molded parts of composite foam is possible. For curing, (water) steam is used, with subsequently applied vacuum or partial vacuum and/or supplied hot air, in order to accelerate the drying and curing process. Instead of steam, microwave energy may be employed.

The method of manufacturing composite foam out of foam flakes and with reduced addition of binding agent, in accordance with the present invention, will be described below with reference to two examples.

Two charges of foam flakes of differing origin and composition are available. The first 10 charge originates from production residue from the manufacture of light polyurethane foam having a density, after forming in the closed mold, of about 60 to 80 kg/m$^3$. By means of sieving, foam flake components having edge lengths of 6, 8, 12 and 15 mm are made available. The foam flakes of the second charge originate from recovered foam seat cushions of vehicles. These foam flakes had a substantially uniform edge length of the order of 8 mm. In preliminary trials concerning the wetting of the foam flakes with a polyurethane dispersion binding agent and the subsequent process steps of conveying (transporting) and dosing, it was determined that foam flakes with edge lengths of the order of 8 mm showed optimal results.

In the first example, of the first charge only those foam flakes with edge length of 8 mm are selected and mixed with those of the second charge. The foam flakes from the two charges are combined, each 50 parts by weight, to a mixture and wetted with a binding agent. As binding agent there is employed an aqueous binding agent mixture of NCO-prepolymer with blocked isocyanate groups which contained a polyamide component having primary and/or secondary (cyclo)aliphatically bound amino groups.

The polyurethane dispersion binding agent was diluted with water in the ratio 1:1 parts by weight. Of this solution, and referred to the weight of the foam flakes employed, 20 weight % were put to use in the examples.

For manufacturing the composite foam of foam flakes, after the wetting, the foam flakes were drawn into a dosing reservoir by means of vacuum, and from here blown into a mold bed using overpressure, via two injectors, the mold bed having the dimensions 550×308×25 mm. For 30 seconds steam was flowed through the mold bed at a pressure of 4 bar and a temperature of 153° C. The steam temperature may by varied within the range from 120 to 180° C., preferably in the range from 140 to 160° C. Subsequently, vacuum was applied to draw off the residual moisture, from vapours out of the composite foam. The lower temperature limit of 120°

C. arises because only from this temperature is the aqueous binding agent with the blocked isocyanate groups capable of reaction, and the upper temperature limit arises because at higher temperatures thermal decomposition would set in.

In the second example exclusively foam flakes, which are of one kind in terms of origin, from the first charge are employed likewise with a uniform edge length of the order of 8 mm. In this case also, the same polyurethane dispersion binding agent was diluted with water 1:1 parts by weight and of this solution, referred to the weight of the foam flakes, 20 weight % were applied to the foam flakes for wetting. The further process steps corresponded to those of the first example.

For the determination of the optimum set time for the flow through of steam and the application of vacuum, preliminary experiments have likewise being carried out. Both parameters were varied so that mechanical characteristic values as good as possible were provided. With the preferred steam temperature range (140 to 160° C.), the steam through-flow times were in range from 15 to 60 seconds, with an optimal value of 30 seconds, and the vacuum times were 30 to 45 seconds, with an optimal value of 45 seconds.

The composite foams of foam flakes with reduced use of binding agent, manufactured with the described process, lead to molded parts with the values given in the table.

TABLE 1

| | From Trial 1 | From Trial 2 |
|---|---|---|
| Density Kg/m$^3$ | x = 296.8 | x = 262.2 |
| DIN 53420 | n = 3 | n = 3 |
| Compression hardness kPa | x = 32.2 | x = 22.4 |
| DIN 53577 at 40% | n = 3 | n = 3 |
| Tensile strength N/mm$^2$ | x = 0.04 = 40 kPa | x = 0.05 = 50 kPa |
| DIN 53571 A | n = 5 | n = 5 |
| Elongation at breaking % | x = 22.4 | x = 18.7 |
| DIN 53571 A | n = 5 | n = 5 |
| Modulus of Elasticity N/m$^2$ | x = 57234 | x = 117406 |
| DIN 53426 | n = 6 | n = 4 |
| Loss/Dissipation factor | x = 0.23 | x = 0.25 |
| DIN 53426 | n = 6 | n = 4 |

Here:
n = the number of samples used
x = the middle value of the measured values for the samples The modulus of elasticity (E-modulus) and the loss factor were measured at 23° C. and 50% relative humidity, conditioned for 24 hours, and in a frequency range from 50 to 70 Hz. The dimensions of the samples were (width, length, height) 50 mm×50 mm×22 mm.

On further samples of the molded parts formed by means of such composite foams there were determined the acoustic data such as dynamic modulus of elasticity and loss factor in accordance with the vertical displacement test according to DIN 53426.

The modulus of elasticity E lies, accordingly, expediently in the range between 50 000 and 140 000 N/m$^2$, the loss factor is expediently greater than 0.2 and the density is expediently greater than 150 kg/m$^3$. The density (bulk specific gravity) can be controlled by way of the filling quantity of foam flakes. The value of the density of over 150 kg/m$^3$ arises because at lower densities the internal strength of the manufactured part reduces greatly. The preliminary trials showed that foam flakes with edge lengths of less than 8 mm lead to a higher density, but also have the consequence of increased use of binding agent. Larger foam flakes with edge lengths above 8 mm make lower densities possible, but the surface quality and the uniformity of the surface is reduced.

Further trials showed that for wetting the foam flakes with the polyurethane dispersion material even 5 weight % of the binding agent, referred to the weight of the foam flakes employed, were sufficient in particular if the outer surface of a composite foam produced in accordance with the invention is not exposed to any direct mechanical loading in the direction of extension of the outer surface, for example of the nature of chafing movements.

The method according to the invention, with the employment of an aqueous polyurethane dispersion as binding agent, is advantageous because the wetting can be effected with relatively small quantities of binding agent and the conveyability or transportability and the ready removability from the mold, with the employment of only small amounts of release material, effect clear advantages with regard to the employment of standard prepolymers or to 2K-polyurethane-binding agents. Beyond the polyurethane dispersion binding agent, no further additives, pigments or other supplementary materials are needed. Because of the optimal conditioning of the foam flakes by means of the polyurethane dispersion binding agent a continuous production line manufacture is possible as well as the manufacture of the composite foam in a mold. This continuous production line manufacture is advantageously effected with the employment of double conveyor presses, as are conventional per se. Molded parts of composite foam manufactured according to the method in accordance with the invention can be employed for sound insulation in vehicles and in general machine construction. In particular for such uses there may be provided adhesive coatings, known per se, which achieve a force-locking or bonding connection with a metal sheet or the like but nonetheless allow subsequent removal without destruction. The composite foam is also suitable as a footfall sound insulation component in dry flooring plaster elements in building construction, and as acoustically effective intermediate layer in three-layered composite systems such as are employed for light-construction walls. The two outer layers of such systems are for example of plaster-fiber board or other inorganic materials usual in construction, of plastics or wood boards.

BRIEF DESCRIPTION OF THE DRAWINGS

The formation and the use of the composite foam will be described in more detail with reference to the examples of use illustrated in the drawings, which show.

DETAILED DESCRIPTION OF THE INVENTION

The invention will first be described in more detail with reference to FIGS. 1 and 2.

Figure 1:
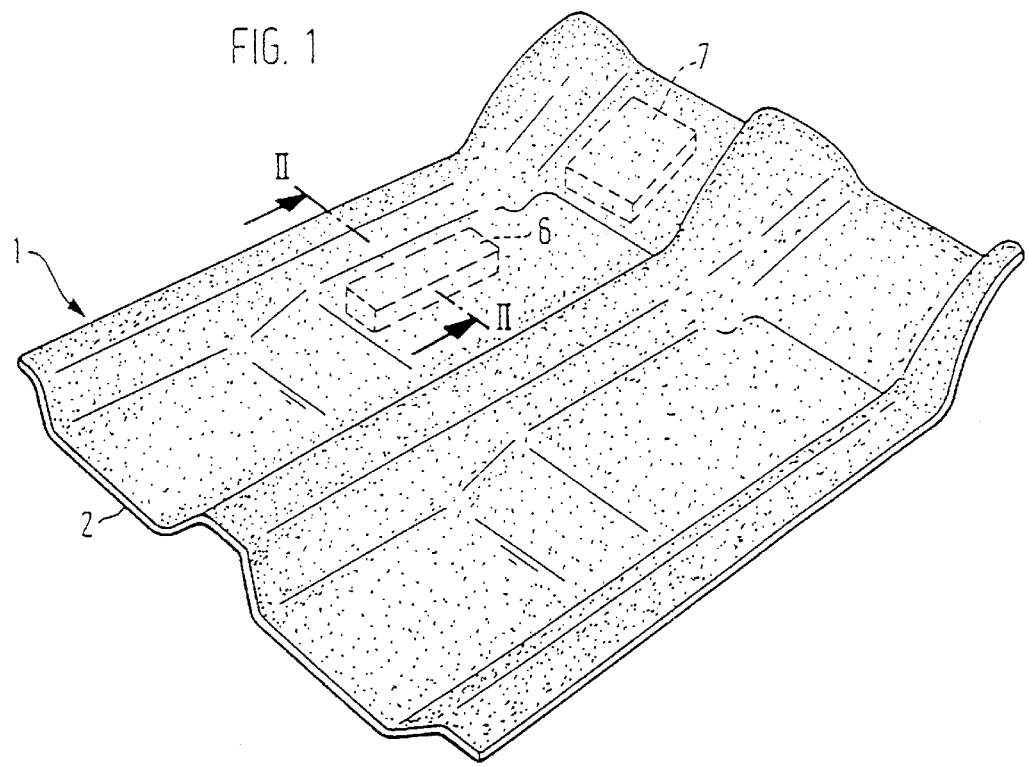
FIG. 1 a shell-like component, which can be placed in vehicles, in perspective view, FIG. 2 the section II—II of FIG. 1, FIG. 3 a footfall sound insulation part, in a building construction, using the present invention, shown in section, FIG. 4 a dividing wall using the present invention, shown in section.
Figure 2:
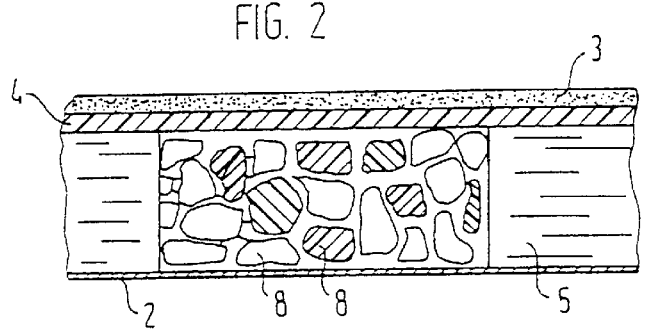

FIG. 1 shows a molded part such as can be inserted, in particular, into motor vehicles. Molded parts of this kind have in principle been long known; for example such molded parts are described in DE-AS 20 06 741. The molded part 1 is laid on or glued to the floor panel 2 of a car body. The visible side, that is the side of such a molded part 1 towards to passenger compartment, is formed by carpeting 3. In between, there is a mass-spring-system for sound insulation purposes. This consists of a sound damping flexible yieldable heavy layer 4 which adjoins carpeting 3 and a spring 5 of foamed material which is arranged between the heavy layer 4 and the floor panel 2. The individual layers can be fixedly bonded to one another or formed onto one another. Of significance is only a force-locking connection between them, as is known per se. A force and form-locking connection between spring 5 and floor panel 2 can for example also be achieved by means of a per se known adhesive coating or means, which enables subsequent removal without destruction. Further, the heavy layer 4 may be directly foamed onto the carpeting 3.

In regions of greater mechanical loading there is provided, instead of the spring 5, a composite foam element in accordance with the invention which in comparison with heavy layer 5 likewise has a significantly lower density.

Such elements are on the one hand a sill reinforcement 6 and on the other hand a foot support 7.

The construction of the composite foam of the sill reinforcement 6 in accordance with the invention will be described with reference to FIG. 2. The construction of the composite foam of the foot support 7 is similar in principle.

The composite foam contains foam flakes 8 which may have different origins, different compositions and/or different edge lengths, and which have been treated according to the method in accordance with the invention for forming the composite foam. The irregular contours and the different shadings are to indicate that the treated foam flakes 8 have been formed, cured and dried, for example in a mold, so that they can be integrated into the molded part 1. Thereby, the necessary physical conditions—in particular those necessary for acoustic technical purposes—are maintained, in particular a density of over 150 kg/m$^3$, a dynamic modulus of elasticity in the region between 50000 and 140000 N/m$^2$, and a loss factor of more than 0.2.

For forming the molded part 1, the composite foam part, for example the sill reinforcement 6 or the foot support 7, is already emplaced at the corresponding position of the spring upon its formation, but may also be put in place later.

Figure 3:
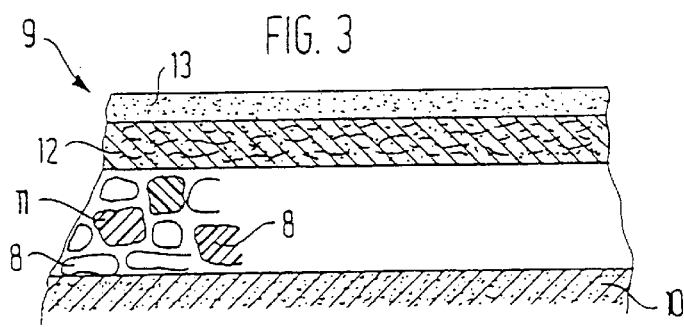

FIG. 3 shows the employment of the composite foam in accordance with the invention in building construction, in this case as footfall sound insulation 9. The composite foam layer 11 is applied to flooring plaster 10 and on the composite foam layer 11 there is a panel or sheet 12, for example a plaster-fibre board panel or a wood-fibre board, on which there is or to which there can be applied a floor covering 13 such as carpeting.

The flooring plaster 10 may be constituted by a dry plaster constructional element so that there is formed a prefabricated construction sheet with footfall sound insulation properties. In the latter case, the composite foam layer 11 is fixedly bonded to the flooring plaster 10 and it is expedient to fixedly bond also the sheet 12 with the composite foam layer 11. As appropriate for each particular application, the floor covering 13 may be fixedly bonded to the sheet 12 or may be laid at a later time over several so-formed constructional elements.

For laying on internal flooring plaster surfaces within a building, the composite foam layer 11 may be employed as a independent product or it can be fixedly bonded to the sheet 12.

Figure 4:
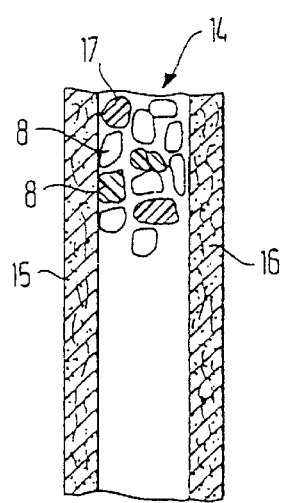

FIG. 4 shows a dividing wall element 14 with two sheet or board elements 15 and 16 which may be the same or may be different. Plaster-fibre boards, plaster-paper boards, wood panel elements or the like may be employed as such board or sheet elements. A composite foam layer 17 manufactured according to the method in accordance with the invention is located between the two panel elements 15 and 16. This filling of the dividing wall, formed by means of the composite foam layer 17, achieves a significant sound insulation effect between the rooms separated by the dividing wall element 14.

Other uses in machine construction and in buildings are, of course, also conceivable.

What is claimed is:

1. A method of manufacturing a composite foam having a density, elastic modulus and loss factor so as to provide a finished composite foam product having sound dampening acoustical properties, said method comprising the steps of:

(a) wetting reclaimed foam flakes of differing reclamation origins with 5 wt. % to 20 wt %, based on the weight of the foam flakes, of an aqueous polyurethane dispersion binding agent, said binding agent comprising a 1:1 mixture with water of an NCO-prepolymer with blocked isocyanate groups and containing a polyamine component having primary and/or secondary (cyclo) aliphatically bonded amino groups;

(b) forming the wetted foam flakes into a molded part or continuous web;

(c) hardening the molded part or continuous web by applying hot (water) steam or microwave energy; and (d) drying the hardened molded part or continuous web with hot air and/or vacuum, wherein the density is greater than 150 kg/m$^3$, the elastic modulus is in the range between 50,000 and 140,000 N/m$^2$ and the loss factor is greater than 0.2.

2. The method of claim 1, wherein the foam flakes have edge lengths in the range between 6 and 15 millimeters.

3. The method of claim 1, wherein for hardening there is employed steam with a temperature between 120 and 180° C. at a pressure of about 4 bar.

4. A method of manufacturing a composite foam having a density, elastic modulus and loss factor so as to provide a finished composite foam product having sound dampening acoustical properties, said method comprising the steps of:

(a) wetting reclaimed foam flakes of differing sizes, differing origins, and differing material compositions with 5 wt. % to 20 wt %, based on the weight of the foam flakes, of an aqueous polyurethane dispersion binding agent, said binding agent comprising a 1:1 mixture with water of an NCO-prepolymer with blocked isocyanate groups and containing a polyamine component having primary and/or secondary (cyclo) aliphatically bonded amino groups;

(b) forming the wetted foam flakes into a molded part or continuous web;

(c) hardening the molded part or continuous web by applying hot (water) steam or microwave energy; and (d) drying the hardened molded part or continuous web with hot air and/or vacuum, wherein the density is greater than 150 kg/m$^3$, the elastic modulus is in the range between 50,000 and 140,000 N/m$^2$ and the loss factor is greater than 0.2.

5. Method according to claim 4, wherein the foam flakes have edge lengths between 6 and 15 mm.

6. Method according to claim 4, wherein said (water) steam has a temperature between 120° C. and 180° C. at a pressure of about 4 bar.

7. The method of claim 6 wherein said steam has a temperature between 140° C. and 160° C.

8. Use of the composite foam manufactured according to the method of claim 4, for sound insulation in vehicles and in general machine construction.

9. Use of the composite foam manufactured according to the method of claim 4 as a footfall sound insulation component in dry flooring plaster elements or for application onto flooring plaster for building construction.

10. Use of the composite foam manufactured according to the method of claim 4, as a an acoustically effective intermediate layer in three-layer composite systems, as light-construction walls or as dividing wall elements.

11. The method of claim 4 wherein said foam flakes have edge lengths about 8 mm.

* * * * *